(12) United States Patent
Yak et al.

(10) Patent No.: US 7,127,731 B2
(45) Date of Patent: Oct. 24, 2006

(54) APPARATUS FOR READING INFORMATION, SUPPORTING MEANS FOR USE IN THE APPARATUS AND METHOD FOR ROTATING A DATE CARRIER

(75) Inventors: Aik Seng Yak, Singapore (SG); Madan Pushpakath, Singapore (SG)

(73) Assignee: Koninklijke Philips Electronics N. V., Eindhoven (NL)

( * ) Notice: Subject to any disclaimer, the term of this patent is extended or adjusted under 35 U.S.C. 154(b) by 65 days.

(21) Appl. No.: 10/505,504

(22) PCT Filed: Jan. 31, 2003

(86) PCT No.: PCT/IB03/00354

§ 371 (c)(1),
(2), (4) Date: Aug. 24, 2004

(87) PCT Pub. No.: WO03/073418

PCT Pub. Date: Sep. 4, 2003

(65) Prior Publication Data

US 2005/0097588 A1    May 5, 2005

(30) Foreign Application Priority Data

Feb. 26, 2002    (SG)    .................... PCT/SG02/00040

(51) Int. Cl.
*G11B 17/28* (2006.01)
*G11B 25/04* (2006.01)

(52) U.S. Cl. .................. 720/700; 720/701; 720/717
(58) Field of Classification Search ........... 720/700, 720/701, 695, 704, 717

See application file for complete search history.

(56) References Cited

U.S. PATENT DOCUMENTS

| 4,981,585 A | * | 1/1991 | Kelley et al. | ............... 210/138 |
| 5,539,267 A | * | 7/1996 | Fan et al. | ................... 310/309 |
| 6,865,744 B1 | * | 3/2005 | Oldermann et al. | ........ 720/717 |

FOREIGN PATENT DOCUMENTS

| JP | 57082205 A | * | 5/1982 |
| JP | 62277657 A | * | 12/1987 |
| JP | 03157859 A | * | 7/1991 |
| JP | 08180644 A | * | 7/1996 |
| JP | 10269692 A | * | 10/1998 |
| JP | 11134788 A | * | 5/1999 |

OTHER PUBLICATIONS

"Disk-Centering Hub," Aug. 1, 1983, IBM Technical Disclosure Bulletin, vol. No. 26, Iss. No. 3A, p. 1243.*

* cited by examiner

*Primary Examiner*—William J Klimowicz
(74) *Attorney, Agent, or Firm*—Michael E. Belk

(57) ABSTRACT

Disclosed is an apparatus for reading information recorded on the track of a data carrier (1). The apparatus comprises rotating means (2) for supporting and rotating the data carrier (1) around an axis of rotation (3). The rotating means (2) comprises a turntable (21) and a motor (23) for rotating the turntable (21). The apparatus according to the invention is able to suppress a wobble introduced by the data carrier (1) when rotated. This is done by a flexible part (24) in the rotating means (2). In an embodiment the supporting surface of the turntable (21) comprises the flexible part (24). This allows the data carrier (1) to tilt in radial and tangential direction. The centrifugal force which are present when rotation the data carrier (1), are able to level the data carrier (1), thus reducing the wobble.

6 Claims, 5 Drawing Sheets

APPARATUS FOR READING INFORMATION, SUPPORTING MEANS FOR USE IN THE APPARATUS AND METHOD FOR ROTATING A DATE CARRIER

This application is a 371 of PCT/IB03/00354 Jan. 31, 2003.

FIELD OF INVENTION

An apparatus for reading information recorded on a track of a data carrier, the apparatus comprising:
    a transducer for reading the information recorded on the track on the data carrier, and
    rotating means for supporting and rotating the data carrier around an axis of rotation, comprising:
        a turntable for supporting the data carrier, and
        a motor for rotating the turntable.

BACKGROUND OF THE INVENTION

An embodiment of an apparatus according to the opening paragraph is known from WO 00/10166. The known apparatus for reading information recorded on a track of a data carrier comprises a transducer for generating a detection signal in response to the recorded signal on the data carrier. The apparatus has correction means for correcting radial tilt. Radial tilt is an obliquity of the data carrier in a plane oriented transversely to the part of the track that is read by the transducer and transversely to the data carrier.

The apparatus further has error signal generating means for generating an error signal for the correction means. The error signal generating means calculate the error signal from a correlation between a first auxiliary signal and a second auxiliary signal and from the correlation between the first auxiliary signal and a third auxiliary signal, which auxiliary signals are derived from the detection signal. The second and the third auxiliary signal are estimates of the recorded signal. The first and the third auxiliary signal respectively have a first delay and a second delay with respect to the second auxiliary signal, the magnitude of the delays corresponding to the duration of one revolution and two revolutions of the data carrier.

The correction means as described in WO 00/10166 comprises actuators for changing the radial tilt orientation of the transducer with respect to the data carrier. Also a transparent plate can be used which by tilting this plate in radial direction can change the radial tilt error.

An other embodiment of an apparatus according to the opening lines is known from WO 00/10165. The known apparatus for reading information recorded on a track of a data carrier comprises a transducer for generating a detection signal in response to the recorded signal on the data carrier. The apparatus has correction means for correcting tangential tilt. Tangential tilt is obliquity of the data carrier in a plane oriented parallel to the part of the track that is read by the transducer and transversely to the data carrier.

The apparatus further has error signal generating means for generating an error signal for the correction means. The error signal generating means are adapted to derive the error signal for the error signal from a temporal asymmetry of the response of the read signal to recorded signal.

The correction means as described in WO 00/10165 comprises actuators for changing the radial tilt orientation of the transducer with respect to the data carrier. Also a transparent plate can be used which by tilting this plate in radial direction can change the radial tilt error.

When the data carrier has a tilt error, a wobble of the data carrier in a direction transverse to the data carrier is introduced when the data carrier is rotated. This results in a focused reading spot with dynamic coma aberrations in both the radial and tangential directions. Disc reading performance of the transducer given the continuously changing radial and tangential tilt levels is thus very poor, even with the correction means of the known apparatus.

BRIEF SUMMARY OF THE INVENTION

It is a first object of the invention to provide an apparatus of the kind described in the opening paragraph which correction means are able to further reduce the wobble of the data carrier when the data carrier is rotated.

It is a second object of the invention to provide a method for rotating a data carrier where the wobble of the data carrier when the data carrier is rotated is reduced.

The first object is realized in that the rotating means comprise a flexible part for allowing the data carrier to tilt around two mutual perpendicular axes which are perpendicular to the axis of rotation. Tilting around the two mutual perpendicular axes is commonly known as radial tilting and tangential tilting. The two mutual perpendicular axes together with the axis of rotation form a three dimensional coordinate system. As the record carrier is allowed to tilt around two mutual perpendicular axes which are perpendicular to the axis of rotation the record carrier can tilt in any direction which is a superposition of these two axis. By this measure the wobble is suppressed by the centrifugal forces working on the data carrier when it is rotated. The physical explanation is as follows.

The rotating data carrier with a tilt can be idealized as point masses rotating about the centre of the turntable at a certain distance. As a result of the rotation of the data carrier a centrifugal force is generated which has components parallel and perpendicular to the surface of the data carrier. The horizontal components cancel each other out while perpendicular components act like a correcting moment trying to bring the data carrier horizontal again, thus trying to neutralize the tilt the data carrier in radial and tangential direction. However, if the rotating means are rigid, considerable centrifugal force is needed to distort the data carrier to get some reduction in tilt. By providing the rotating means with a flexible part which allows the data carrier to tilt around two mutual perpendicular axes which are perpendicular to the axis of rotation, the centrifugal force is able to level the data carrier. Thus the surface of the turntable which contacts the data carrier is able to take the profile of the spinning data carrier when it is level. The lower the stiffness of the rotating means, i.e. the turntable, the lower the speed required to bring the data carrier back to horizontal.

The invention has the further advantage in that it is able to reduce the wobble without electronic correction means.

In an embodiment of the invention the flexible part of the rotating means comprises a flexible supporting surface of the turntable for the data carrier. In this embodiment the centrifugal force acting on the data carrier is directly transferred to the flexible supporting surface. The centrifugal force thus only has to level the data carrier, no extra mass needs to be moved.

It is advantageous if the flexible supporting surface comprises a gel like substance containing space between the turntable and the data carrier, which gel like substance containing space provides the flexibility of the flexible supporting surface. This embodiment is relatively easy to implement. For instance, a ring of some synthetic material which contains the gel like substance can be placed between the turntable and the data carrier.

In an other embodiment of the invention the flexible supporting surface is realized in that the flexible supporting surface comprises:
- an outer ring for supporting the data carrier;
- an inner ring which is connected to the motor which is able to rotate the inner ring;
- a spring which connects the outer ring with the inner ring and is flexible in a direction parallel to the axis of rotation, and which is inflexible in a rotational direction around the axis of rotation.

With this embodiment the data carrier is also free to tilt around two mutual perpendicular axes which are perpendicular to the axis of rotation, thereby able to reduce the wobble with the help of the centrifugal forces. Of course an other embodiment can be realized by an inner ring that supports the data carrier and an outer ring which is rotated by the motor, and a spring which connects the outer ring with the inner ring.

The second object is realized in that the data carrier is able to tilt around two mutual perpendicular axes which are perpendicular to the axis of rotation, by using supporting means which comprise a flexible part.

BRIEF DESCRIPTION OF THE DRAWINGS

These and other aspects of the invention will be described in more detail with reference to the drawing. In the drawings.

DETAILED DESCRIPTION OF THE INVENTION

Figure 1:
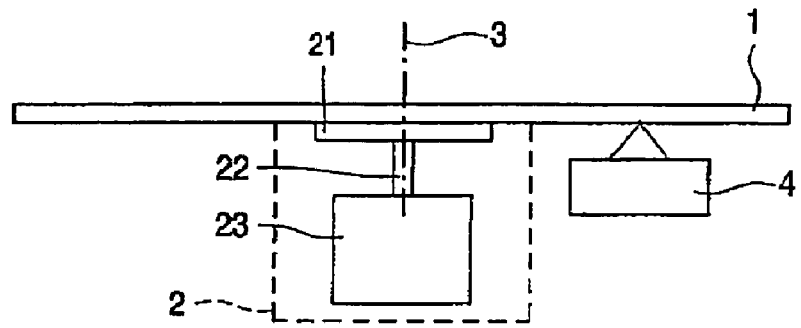
FIG. 1 diagrammatically shows a known apparatus for reading information recorded on a track of a data carrier, FIG. 2 schematically shows a data carrier together with the axis of rotation and the two mutual perpendicular axes, FIG. 3 diagrammatically shows an embodiment of the apparatus in accordance with the invention, FIG. 4 diagrammatically shows an other embodiment of the apparatus in accordance with the invention.

In FIG. 1 an embodiment of the known apparatus for reading information recorded on a track of data carrier 1 comprises rotating means 2. The rotating means 2 are able to rotate the data carrier 1 around the axis of rotation 3. The data carrier 1 can be an optical disc, for instance a Compact Disc (CD) or a Digital Versatile Disc (DVD). Also present is a transducer 4 which is able to read a readable pattern on the track of the data carrier 1. The rotating means 2 comprises a motor 23 and a turntable 21, where the motor 23 and the turntable are connected via a shaft 22.

The commercial optical discs (CD and DVD) available in the market today show considerable variations of distortions in radial and tangential directions. Tilt of the disc causes wobble when it is spinning, this results in a focused reading spot with dynamic come aberrations in both the tangential and radial directions. Disc reading performance of the transducer given the continuously changing radial/tangential tilt levels is thus very poor, even with the active tilt corrections of the known apparatus. This poses a challenge to design a system that can handle the wide and varied disc characteristics with respect to tilt and wobble.

If the rotating means 2 is provided with a flexible part 24 that allows the data carrier 1 to tilt in radial and tangential direction then the wobble is suppressed. The driving forces behind this suppression are the centrifugal forces that arise when rotating the data carrier 1. These forces supply a moment on the data carrier 1 trying to bring the data carrier 1 in horizontal position again. If the turntable 21 is rigid, then considerable centrifugal force is needed to distort the data carrier 1 to get some reduction in tilt. The flexible part 24 provides the needed flexibility to allow the data carrier 1 to level under the influence of the centrifugal force.

Figure 2:
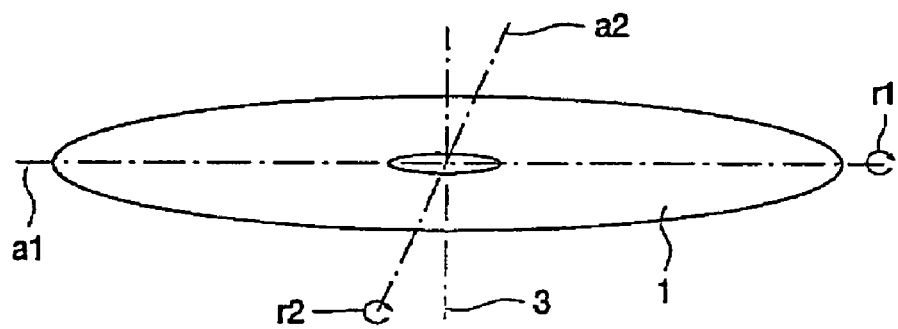

In FIG. 2 an example of two mutual perpendicular axes a1 and a2 which are also perpendicular to the axis of rotation 3 are shown. The sketch is in perceptive. The two mutual perpendicular axes a1 and a2 are situated in the surface of the data carrier 1. The arrow r1 indicates the rotation of the data carrier 1 around axis a1 and the arrow r2 indicates the rotation of the data carrier 1 around axis a2. The mutual perpendicular axes a1 and a2 are examples, there are an indefinite number of possible mutual perpendicular axes which would suffice. Tangential tilt can be defined as the tilt around an axis a1, if that axis would also be transversely with respect to the part of the track that is being read by the transducer 4. Radial tilt can be defined as the tilt around an axis a2, if that axis would also be parallel with respect to the part of the track that is being read by the transducer 4.

Figure 3:
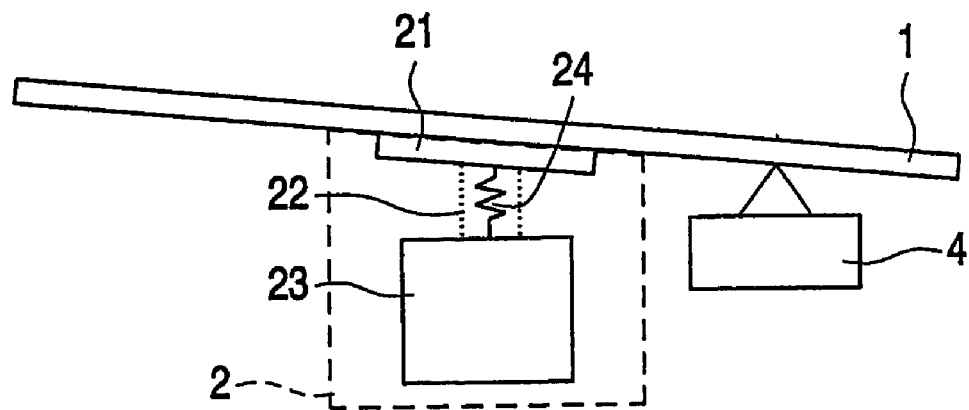

In an embodiment as shown in FIG. 3 the flexible part 24 is a flexible shaft 22. Here the centrifugal forces need to tilt only the data carrier 1 and the turntable 21.

Figure 4:
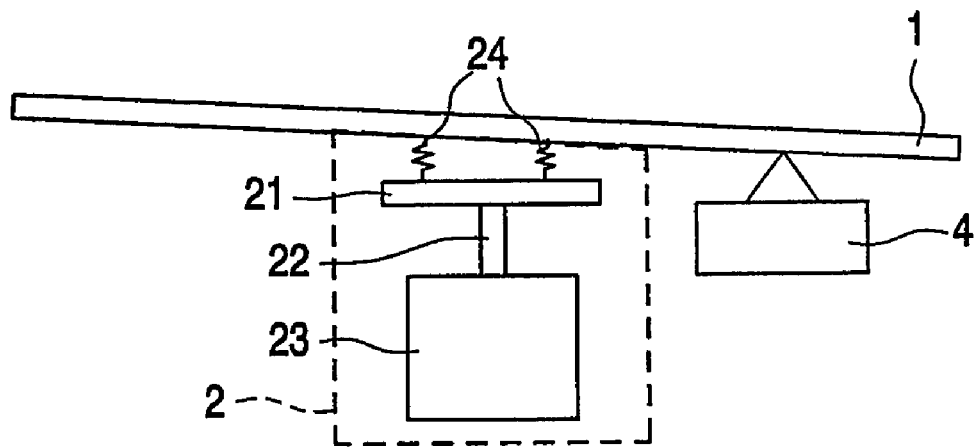

An embodiment where the flexible part 24 is a flexible supporting surface of the turntable 21 can be seen in FIG. 4. The centrifugal force need only to tilt the data carrier 1. Thus also at relatively low rotation speeds the centrifugal force can suppress the wobble.

Figure 5A:
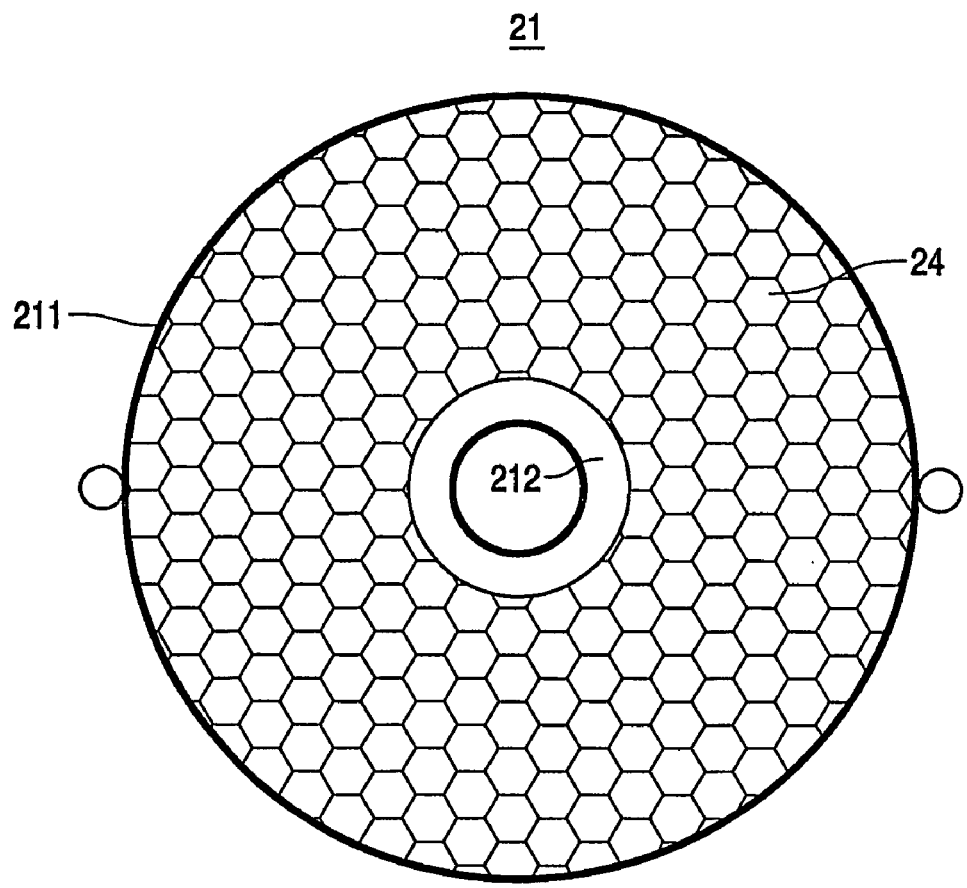
FIG. 5a shows an example of an upper view of the flexible supporting surface with a spring between an outer ring and an inner ring.
Figure 5B:
FIG. 5b shows an example of side view of the flexible supporting surface of FIG. 5a, FIG. 6 shows a side view of an other embodiment of the flexible supporting surface with a spring between an outer ring and an inner ring.

In FIGS. 5a and 5b a further detailed embodiment of the flexible supporting surface is shown. The turntable 21 in this embodiment comprises an outer ring 211, an inner ring 212 and the flexible part 24 in the form of a spring. The inner ring 212 supports the data carrier 1. The outer ring 211 is rotated by the motor 23. The data carrier 1 has the freedom of movement to tilt in radial and tangential direction. In the rotational direction the spring is stiff so that it translates the rotating force of the motor 23 from the outer ring 211 to the inner ring 212.

Figure 6:
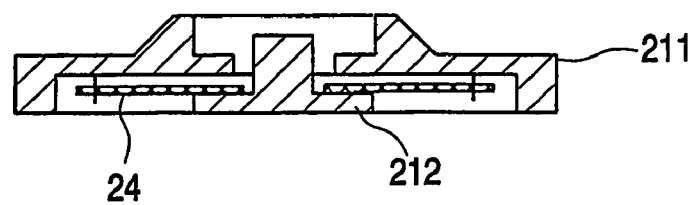

An other implementation of the flexible supporting surface with an outer ring 211, an inner ring 212 and a spring is shown in FIG. 6. Here the inner ring 212 can be rotated by the motor 23, and the outer ring 211 is able to support the data carrier 1.

Figure 7A:
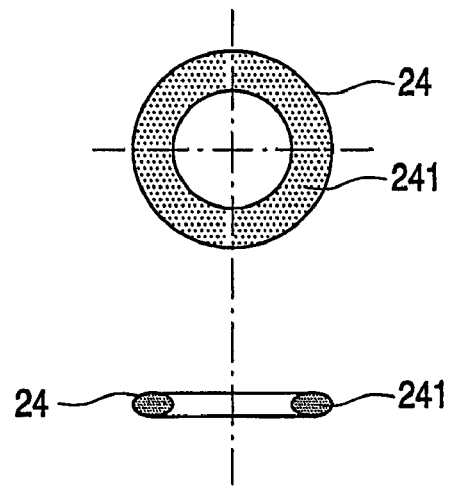
FIG. 7a shows a sketch of an other example of the flexible supporting surface with a gel like substance containing space.
Figure 7B:
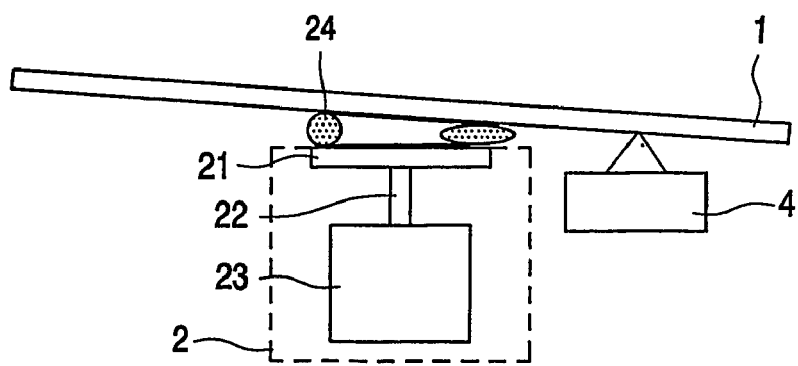
FIG. 7b shows a sketch of the gel like substance containing space of FIG. 7a positioned between the turntable and the data carrier.

An other implementation of the flexible supporting surface can be seen in FIGS. 7a and 7b. Here the flexible supporting surface 24 comprises a gel like substance containing space between the turntable 21 and the data carrier 1. The gel like substance 241 gives the flexibility to the flexible part 24. When the optical data carrier 1 is rotated, the leveling forces of the centrifugal force squeezes the gel like substance 241 naturally to take the shape of the data carrier surface while maintaining the turntable surface at its original place. Thus the wobble is reduced.

Figure 8A:
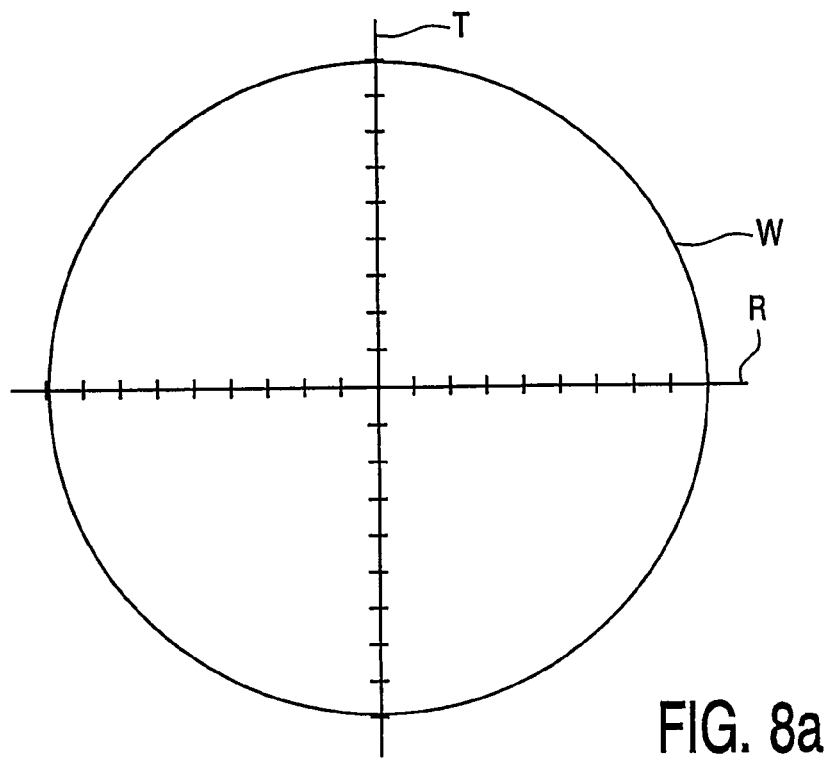
FIG. 8a shows an example of a measurement of the radial and tangential tilt of a data carrier in an apparatus without the flexible part.
Figure 8B:
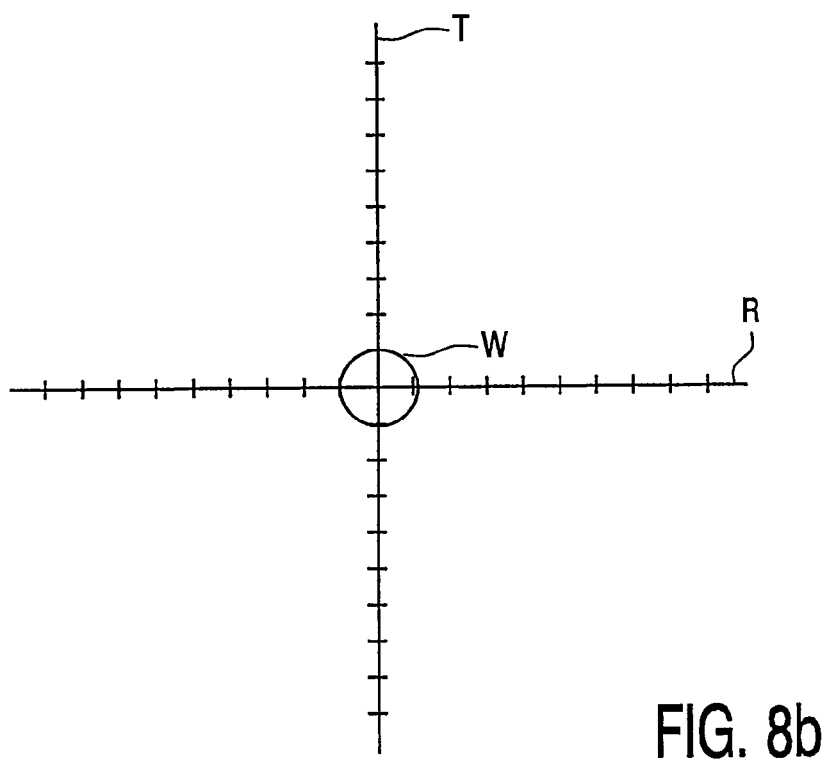
FIG. 8b shows an example of a measurement of the radial and tangential tilt of a data carrier in an apparatus with the flexible part.

In order to measure the reduction of the wobble when using the flexible supporting surface in a CD player, a special vertical deviation disc (VDD) is played on the CD player. In FIG. 8a a co-ordinate system is shown where on the horizontal axis, indicated by R, the radial tilt is shown and on the vertical axis, indicated by T, the tangential tilt is shown. The units are in milli-radials, indicated by the lines on the axes. The result shown in FIG. 8a is obtained by playing the VDD disc on a known CD player without the rotating means 2 of the invention. The measured tangential and radial tilt is indicated by the circle W. Both the tangential tilt and the radial tilt are about 8 mrad in magnitude. In FIG. 8b the results are shown when playing the VDD disc on a CD player according to the invention. Now both the tangential tilt and the radial tilt are reduced to about 1 mrad, a substantial improvement.

The invention claimed is:

1. An apparatus for reading information recorded on a track of a data carrier, the apparatus comprising:
   a transducer for reading the information recorded on the track on the data carrier, and
   rotating means for supporting and rotating the data carrier around an axis of rotation, comprising:
      a turntable comprising a flexible supporting surface for supporting the data carrier, and
      a motor for rotating the turntable, wherein the flexible supporting surface comprises:
      an outer ring which is connected to the motor which is able to rotate the outer ring;
      an inner ring for supporting the data carrier; and
      a spring which connects the outer ring with the inner ring and is flexible in a direction parallel to the axis of rotation, and which is inflexible in a rotational direction around the axis of rotation.

2. An apparatus for reading information recorded on a track of a data carrier, the apparatus comprising:
   a transducer for reading the information recorded on the track on the data carrier, and
   rotating means for supporting and rotating the data carrier around an axis of rotation, comprising:
      a turntable comprising a flexible supporting surface for supporting the data carrier, and
      a motor for rotating the turntable, wherein the flexible supporting surface comprises:
      an outer ring for supporting the data carrier;
      an inner ring which is connected to the motor which is able to rotate the inner ring;
      a spring which connects the outer ring with the inner ring and is flexible in a direction parallel to the axis of rotation, and which is inflexible in a rotational direction around the axis of rotation.

3. Method for rotating a data carrier provided with a track on which information is recorded, comprising the steps of:
   supporting the data carrier with supporting means;
   rotating the data carrier around an axis of rotation by rotating the supporting means, wherein the supporting means comprises:
      an outer ring for supporting the data carrier;
      an inner ring which is connected to a motor which is able to rotate the inner ring;
      a spring which connects the outer ring with the inner ring and is flexible in a direction parallel to the axis of rotation, and which is inflexible in a rotational direction around the axis of rotation.

4. An apparatus for reading information recorded on a track of a data carrier, the apparatus comprising:
   a transducer for reading the information recorded on the track on the data carrier;
   a turntable comprising a flexible supporting surface for supporting the data carrier and rotating the data carrier around an axis of rotation; and
   a motor for rotating the turntable, wherein the flexible supporting surface comprises:
      a first ring connected to the motor which is able to rotate the first ring;
      a second ring for supporting the data carrier; and
      a flexible part connected between the first ring and the second ring, wherein the flexible part is flexible in a direction parallel to the axis of rotation, and is inflexible in a rotational direction around the axis of rotation.

5. The apparatus of claim 4, wherein the first ring is an inner ring and the second ring is an outer ring.

6. The apparatus of claim 4, wherein the first ring is an outer ring and the second ring is an inner ring.

* * * * *